United States Patent Office 3,663,558
Patented May 16, 1972

3,663,558
Δ³ PIPERIDONE ENOL ETHERS AND A PROCESS FOR THEIR PREPARATION
Keisuke Murayama, Toshimasa Toda, Eiko Yamao, Katsuaki Matsui, Tomoyuki Kurumada, Noriyuki Ohta, and Ichiro Watanabe, Tokyo, Japan, assignors to Sankyo Company Limited, Tokyo, Japan
No Drawing. Filed Sept. 15, 1970, Ser. No. 72,522
Claims priority, application Japan, Sept. 27, 1969, 44/77,258; Nov. 4, 1969, 44/88,262
Int. Cl. C07d 31/28
U.S. Cl. 260—297 R    6 Claims

ABSTRACT OF THE DISCLOSURE

New piperidone enol ethers having the formula

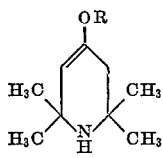

wherein R represents an alkyl group of 1–18 carbon atoms; a cycloalkyl group which contains 5 or 6 carbon atoms and may be substituted with an alkyl group of 1–4 carbon atoms or hydroxyl group; or the group of the formula —$CH_2$—R' in which R' represents an aryl group which contains 6–10 carbon atoms and may be substituted with an alkyl group of 1–4 carbon atoms, an alkoxy group of 1–4 carbon atoms, a halogen atom or hydroxyl group in the aryl moiety or a 5- or 6-membered heterocyclic group which contains oxygen atom as a hetero atom and may be substituted with an alkyl group of 1–4 carbon atoms, an alkoxy group of 1–4 carbon atoms, a halogen atom or hydroxyl group. These piperidone enol ethers are prepared by reacting triacetonamine with an alcohol having the formula

R—OH wherein R is as defined above in the presence of an acid catalyst. These piperidone enol ethers exhibit a superior stabilizing effect against photo- and thermo-deterioration of various synthetic polymers and thus they are useful as a stabilizer for synthetic polymers.

This invention relates to a new class of piperidone enol ethers, a process for the preparation thereof, as well as their use as a stabilizer for the stabilization of synthetic polymers.

More particularly, it is concerned with a piperidone enol ether having the formula

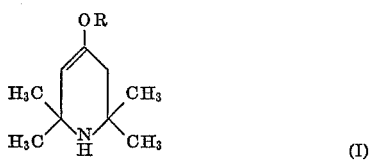 (I)

wherein R represents an alkyl group of 1–18 carbon atoms; a cycloalkyl group which contains 5 or 6 carbon atoms and may be substituted with an alkyl group of 1–4 carbon atoms or hydroxyl group; or the group of the formula —$CH_2$—R' in which R' represents an aryl group which contains 6–10 carbon atoms and may be substituted with an alkyl group of 1–4 carbon atoms, a halogen atom or hydroxyl group in the aryl moiety or a 5- or 6-membered heterocyclic group which contains oxygen atom as a hetero atom and may be substituted with an alkyl group of 1–4 carbon atoms, an alkoxy group of 1–4 carbon atoms, a halogen atom or hydroxyl group and with a process for the preparation of the piperidone enol ether having the above Formula I. It is also concerned with the stabilization of synthetic polymers against photo- and thermo-deterioration thereof by having incorporated therein, in a sufficient amount to prevent such deterioration, the piperidone enol ether having the above Formula I.

In the above Formula I, the group R may be exemplified by methyl, ethyl, n-propyl, n-butyl, n-hexadecyl, stearyl, cyclopentyl, cyclohexyl, 2-methylcyclopentyl, 4-tert.butylcyclopentyl, 5-hydroxycyclopentyl, 2- or 4-methylcyclohexyl, 3- or 5-tert.butylcyclohexyl, 2- or 4-hydroxycyclohexyl, benzyl, naphthylmethyl, o-, m- or p-methylbenzyl, o-, m- or p-tert.butylbenzyl, o-, m- or p-methoxybenzyl, o-, m- or p-n-butoxybenzyl, o-, m- or p-chlorobenzyl, o-, m- or p-bromobenzyl, o-, m- or p-hydroxybenzyl, 4 - hydroxy-3,5-di-tert.butylbenzyl, tetrahydrofurfuryl, pyranylmethyl, 3,4 - dihydro-2H-2-pyranylmethyl, 2,6-dimethyl - 5,6 - dihydro-2H-3-pyranylmethyl and the like.

The term "synthetic polymer" as used herein is intended to embrace:

Polyolefins, including homopolymers of olefins such as low-density polyethylene, high-density polyethylene, polypropylene, polystyrene, polybutadiene, polyisoprene and the like, and copolymers of olefins with other ethylenically unsaturated monomers such as ethylene-propylene copolymer, ethylene-butene copolymer, ethylene-vinyl acetate copolymer, styrene-butadiene copolymer, acrylonitrile- styrene copolymer, acrylonitrile-styrene-butadiene copolymer and the like;

Polyvinyl chlorides and polyvinylidene chlorides, including homopolymer of each of vinyl chloride and vinylidene chloride, vinyl chloride-vinylidene chloride copolymer and copolymers of each of vinyl chloride and vinylidene chloride with vinyl acetate or other ethylenically unsaturated monomers;

Polyesters, including polyethylene terephthalate;

Polyacetals, including polyoxymethylene and polyoxy ethylene;

Polyamides, including 6-nylon, 6,6-nylon, 6,10-nylon, 11-nylon, 7-nylon, 4-nylon, 12-nylon and 9-nylon; and Polyurethanes.

The piperidone enol ethers (I) of this invention are all new substances undisclosed in the prior art. They exhibit a high degree of stabilizing action on the synthetic polymer, e.g., polyolefins, polyvinylchloride, polyvinylidene chloride, polyesters, polyamides and polyurethanes against the deteriorations thereof.

It is, accordingly, an object of this invention to provide the new and valuable piperidone enol ethers of the above Formula I.

It is another object of this invention to provide a process for the preparation of such useful piperidone enol ethers of the above Formula I.

Still another object of this invention is to provide a synthetic polymer composition stabilised against photo- and thermo-deterioration thereof wherein there is incorporated the piperidone enol ethers of the above Formula I.

These and other objects of this invention will be apparent to those skilled in the art from the following detailed disclosure of this invention.

According to this invention, the piperidone enol ethers of the above Formula I can be produced by a process which comprises reacting triacetonamine represented by the formula

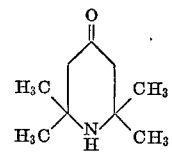

with an alcohol having the formula $$R-OH \quad (II)$$

wherein R is as defined above in the presence of an acid catalyst.

Representative examples of the piperidone enol ethers of the above Formula I are illustratively listed hereinbelow. It is, however, to be understood that this invention is not limited to those listed compounds.

(1) 4-n-butoxy-2,2,6,6-tetramethyl-$\Delta^3$-dehydropiperidine,
(2) 4-n-octyloxy-2,2,6,6-tetramethyl-$\Delta^3$-dehydropiperidine,
(3) 4-isobutoxy-2,2,6,6-tetramethyl-$\Delta^3$-dehydropiperidine,
(4) 4-n-dodecyloxy-2,2,6,6-tetramethyl-$\Delta^3$-dehydropiperidine,
(5) 4-stearyloxy-2,2,6,6-tetramethyl-$\Delta^3$-dehydropiperidine,
(6) 4-tetrahydrofurfuryloxy-2,2,6,6-tetramethyl-$\Delta^3$-dehydropiperidine,
(7) 4-(3,4-dihydro-2H-2-pyranylmethyloxy)-2,2,6,6-tetramethyl-$\Delta^3$-dehydropiperidine,
(8) 4-(2,6-dimethyl-5,6-dihydro-2H-3-pyranylmethyloxy)-2,2,6,6-tetramethyl-$\Delta^3$-dehydropiperidine,
(9) 4-cyclohexyloxy-2,2,6,6-tetramethyl-$\Delta^3$-dehydropiperidine,
(10) 4-(4-methylcyclohexyloxy)-2,2,6,6-tetramethyl-$\Delta^3$-dehydropiperidine,
(11) 4-(4-hydroxycyclohexyloxy)-2,2,6,6-tetramethyl-$\Delta^3$-dehydropiperidine,
(12) 4-cyclopentyloxy-2,2,6,6-tetramethyl-$\Delta^3$-dehydropiperidine,
(13) 4-benzyloxy-2,2,6,6-tetramethyl-$\Delta^3$-dehydropiperidine,
(14) 4-(p-methylbenzyloxy)-2,2,6,6-tetramethyl-$\Delta^3$-dehydropiperidine,
(15) 4-(p-methoxybenzyloxy)-2,2,6,6-tetramethyl-$\Delta^3$-dehydropiperidine,
(16) 4-(p-chlorobenzyloxy)-2,2,6,6-tetramethyl-$\Delta^3$-dehydropiperidine, and
(17) 4-(4-hydroxy-3,5-di-tert.butylbenzyloxy)-2,2,6,6-tetramethyl-$\Delta^3$-dehydropiperidine.

In carrying out the process of this invention, the reaction may be suitably effected in the presence or absence of an inert organic solvent. Examples of such inert organic solvents which may be employed in this reaction include aliphatic hydrocarbons, e.g., n-hexane, kerosene, ligroin and the like and aromatic hydrocarbons, e.g., benzene, toluene, xylene and the like. Examples of the acid catalysts which may be employed in this reaction include mineral acids, e.g., hydrochloric acid, sulfuric acid, phosphoric acid and the like and aromatic sulfonic acids, e.g., benzenesulfonc acid, p-toluenesulfonic acid and the like. The amount of the reactants to be employed is not critical, but it is usual and preferably to employ triacetonamine and the alcohol (II) in a molar ratio of about 1 to about 1.0–1.5. The amount of the acid catalyst to be employed may be of a usual catalytic level. The reaction period and temperature are not critical and may be varied mainly depending upon the types of the particular reactants, especially the particular alcohol employed and other factors, but the reaction may be preferably effected at a reflux temperature of the inert organic solvent employed for about 10–70 hours.

The reaction in the process of this invention may be most preferably effected by reacting the reactants in the presence of the acid catalyst, while the water formed in situ during the reaction is continuously removed by a conventional means, for example, by forming an azeotropic mixture with the inert organic solvent employed such as benzene.

After completion of the reaction, the reaction product can be readily recovered and purified from the reaction mixture by a conventional method. For instance, the reaction mixture is cooled and neutralized by pouring into an ice-cooled aqueous solution of an alkali metal hydroxide, e.g., potassium hydroxide, an organic layer is separated from an aqueous layer and then the separated organic layer is subjected to distillation under reduced pressure to give the desired product.

According to the another aspect of this invention, as explained above, there is also provided a synthetic polymer composition stabilised against photo- and thermo-deterioration thereof wherein there is incorporated, in a sufficient amount to prevent such deterioration, one or more of the piperidone enol ethers (I) of this invention.

Where the piperidone enol ethers of the above Formula I are to be employed in the synthetic polymer for the purpose of stabilization, they may be readily incorporated into such polymers by various standard procedures commonly utilized in the art. The stabilizing piperidone enol ethers (I) of this invention may be incorporated into the synthetic polymers at any desired stage prior to the manufacture of shaped articles therefrom. For example, the stabilizer in a form of powder may be admixed with the synthetic polymer or a solution, suspension or emulsion of such a stabilizer may be admixed with a solution, suspension or emulsion of the polymer of this invention.

The amount of the piperidone enol ethers to be employed in the synthetic polymer in accordance with this invention may be widely varied, depending upon mainly the types, properties and particular use of the polymer to be stabilized.

In general, the piperidone enol ethers of the Formula I may be added in an amount ranging from 0.01 to 5.0% by weight, based upon the amount of the synthetic polymer, but the practical range is varied depending upon the type of the particular synthetic polymer, that is, 0.01 to 2.0% by weight, preferably 0.02 to 1.0% by weight for polyolefins, 0.01 to 2.0% by weight, preferably 0.02 to 1.0% by weight for polyvinyl chloride and polyvinylidene chloride, 0.01 to 5.0% by weight, preferably 0.02 to 2.0% by weight for polyurethanes and polyamides, and 0.01 to 2.0% by weight, preferably 0.05 to 1% by weight for polyesters and polyacetals.

The present stabilizers may be used alone or in combination with other known stabilizers, fillers, pigments and the like.

If desired, two or more of the present stabilizers may also be satisfactorily used in admixture.

In order that this invention may be better understood, the following examples are given, but they are intended solely for the purpose of illustration. In these examples, all parts and percentages are given by weight unless otherwise stated.

Examples 1 through 6 describe the preparation of some of the piperidone enol ethers (I) of this invention.

Examples 7 through 10 describe some of the stabilized synthetic polymer compositions which contain as a stabilizer the piperidone enol ethers (I) of this invention.

EXAMPLE 1

4-n-butoxy-2,2,6,6-tetramethyl-$\Delta^3$-dehydropiperidine

To a solution of 33 g. of triacetonamine in 350 ml. of toluene was added with ice-cooling 37 g. of p-toluenesulfonic acid and then 17 g. of n-butanol with stirring. The resulting mixture was heated under reflux for 20 hours while the water formed in situ during the reaction was continuously removed. After cooling, the reaction mixture was poured into an ice-cooled aqueous potassium hydroxide solution and then aqueous and organic layers were separated. The separated organic layer was washed with water, dried over anhydrous magnesium sulfate and then the solvent was distilled off. The residual liquid was subjected to distillation under reduced pressure to give the desired product as colorless oily substance boiling at 125–130° C./0.15 mm. Hg.

Analysis for $C_{13}H_{25}NO$.—Calculated (percent): C, 73.88; H, 11.92; N, 6.63. Found (percent): C, 74.12; H, 11.90; N, 6.32.

IR spectrum (liquid film):

$\gamma$C=C 1670 cm.$^{-1}$, $\gamma$=C—O—C 1020 cm.$^{-1}$; 1230 cm.$^{-1}$

EXAMPLE 2

4-n-octyloxy-2,2,6,6-tetramethyl-$\Delta^3$-dehydropiperidine

To an ice-cooled solution of 23.4 g. of triacetonamine in 150 ml. of benzene were added 22.1 g. of n-octyl alcohol and 30 g. of p-toluenesulfonic acid. The resulting mixture was heated under reflux for 43 hours while the water formed in situ during the reaction was continuously removed. After completion of the reaction, the reaction mixture was treated in the same manner as in the above Example 1 to give the desired product as colorless oily substance boiling at 125–130° C./0.15 mm. Hg Analysis for $C_{17}N_{33}NO$.—Calculated (percent): C, 76.33; H, 12.44; N, 5.24. Found (percent): C, 75.96; H, 12.58; N, 5.24.

IR spectrum (liquid film):

$\gamma$C=C 1670 cm.$^{-1}$, $\gamma$=C—O—C 1020 cm.$^{-1}$

EXAMPLE 3

4-tetrahydrofurfuryloxy-2,2,6,6-tetramethyl-$\Delta^3$-dehydropiperidine

The same procedure as in the above Example 1 was repeated except that 15.5 g. of triacetonamine, 12 g. of tetrahydrofurfuryl alcohol and 19.2 g. of p-toluenesulfonic acid were employed to give the desired product as colorless oily substance boiling at 100–104° C./2 mm. Hg.

Analysis for $C_{14}H_{25}NO_2$.—Calculated (percent): C, 70.25; H, 10.53; N, 5.83. Found (percent): C, 70.05; H, 10.48; N, 5.74.

Molecular weight (osmometer).—Calculated: 239.35. Found: 233.

IR spectrum (liquid film):

$\gamma$C=C 1673 cm.$^{-1}$, $\gamma$=C—O—C— 1235 cm.$^{-1}$, 1035 cm.$^{-1}$

EXAMPLE 4

4-cyclohexyloxy-2,2,6,6-tetramethyl-$\Delta^3$-dehydropiperidine

The same procedure as in the above Example 2 was repeated except that 23.4 g. of triacetonamine and 18.0 g. of cyclohexyl alcohol to give the desired product as colorless oily substance boiling at 84° C./3 mm. Hg.

Analysis for $C_{15}H_{24}NO$.—Calculated (percent): C, 75.87; H, 11.48; N, 5.90. Found (percent): C, 75.75; H, 11.72; N, 5.86.

IR spectrum (liquid film):

$\gamma$C=C 1670 cm.$^{-1}$, $\gamma$=C—O—C— 1021 cm.$^{-1}$

EXAMPLE 5

4-(4-hydroxycyclohexyloxy)-2,2,6,6-tetramethyl-$\Delta^3$-dehydropiperidine

The same reaction procedure as in the above Example 2 was repeated except that 29.0 g. of triacetonamine and 8.1 g. of cyclohexane-1,4-diol were employed. After completion of the reaction, the reaction mixture was treated in the same manner as in the above Example 2 except that petroleum ether was added to the residual liquid, the crystalline substance thus separated was recovered by filtration and then recrystallized from benzene to give the desired product as white crystals melting at 130.5–131.5° C.

Analysis for $C_{15}H_{27}NO_2$.—Calculated (percent): C, 71.10; H, 10.74; N, 5.53. Found (percent): C, 70.93; H, 10.49; N, 5.43.

IR spectrum (Nujol Mull):

$\gamma$OH 3310 cm.$^{-1}$, $\gamma$C=C 1668 cm.$^{-1}$
$\gamma$=C—O—C— 1230 cm.$^{-1}$

EXAMPLE 6

4-benzyloxy-2,2,6,6-tetramethyl-$\Delta^3$-dehydropiperidine

The same procedure as in the above Example 2 was repeated except that 23.4 g. of triacetonamine and 17.6 g. of benzyl alcohol were employed to give the desired product as colorless oily substance boiling at 117° C./2 mm. Hg. This substance crystallized upon cooling to give white crystals melting at 37.5–38.5° C.

Analysis for $C_{15}H_{23}NO$.—Calculated (percent): C, 78.32; H, 9.45; N, 5.71. Found (percent): C, 78.68; H, 9.36; N, 5.90.

IR spectrum (Nujol Mull):

$\gamma$C=C 1670 cm.$^{-1}$, $\gamma$=C—O—C— 1020 cm.$^{-1}$ $\delta$ CH (monosubstituted benzene) 695 cm.$^{-1}$; 730 cm.$^{-1}$

EXAMPLE 7

Into 100 parts of polypropylene ["Noblen JHH-G," trade name, available from Mitsui Toatsu Chemicals Inc., Japan, employed after twice recrystallizations from monochlorobenzene] was incorporated 0.25 part of each of the test compounds of this invention indicated in the following Table 1. The resulting mixture was uniformly mixed and melted and then molded into a sheet having a thickness of 0.5 mm. under heating and pressure.

As a control, the polypropylene sheet was prepared in a similar manner to that described above without addition of any of stabilizers for comparative purpose.

Then, all of these sheets thus formed were tested for the brittleness time (which means the time until the test sheet will become brittle, expressed in terms of hour) under ultraviolet irradiation at a temperature of 45° C. by means of the fade meter prescribed in Japanese Industrial Standard JIS–1044 entitled "Testing Method of Color Fastness to Light of Dyed Textiles and Dyestuffs," paragraph 3.8 (in English).

The results are given in the following Table 1.

TABLE 1

| Test compound No.[1]: | Brittleness time (hour) |
|---|---|
| 1 | 660 |
| 2 | 640 |
| 3 | 720 |
| 5 | 680 |
| 6 | 540 |
| 9 | 440 |
| 13 | 520 |
| None | 60 |

[1] The number of the test compound is the same as specified hereinabove.

EXAMPLE 8

Into 100 parts of polyvinyl chloride ["Geon 103 EP," trade name, available from The Japanese Geon Co. Ltd., Japan] were incorporated 0.5 part of barium stearate, 0.5 part of cadmium stearate and 0.2 part of each of the test compounds of this invention indicated in the following Tables 2 and 3. The resulting mixture was blended and kneaded for 4 minutes on a kneading roll at 180° C. and formed into a sheet having a thickness of about 0.5 mm. The sheet was tested for the discoloration degree thereof by the aging test method set forth below.

Aging test (1) The sheet was aged for 90 minutes at 170° C. in the Geer's aging tester prescribed in Japanese Industrial Standard JIS–K–6301 entitled "Physical Testing Methods for Vulcanized Rubber," paragraph 6.5 (in English). The results are summarized in the following Table 2.

(2) Exposure to the sunshine carbon weatherometer prescribed in Japanese Industrial Standard JIS–Z–0230 entitled "Accelerated Weathering Test of Rust Proofing Oils," paragraph 2 for 1000 hours.

The results are summarized in the following Table 3.

TABLE 2

| Test compound No.[1]: | Discoloration degree—Geer's tester 170° C., 90 minutes |
|---|---|
| 1 | Yellow. |
| 2 | Pale yellow. |
| 9 | Do. |
| 13 | Do. |
| None | Black. |

[1] The number of the test compound is the same as specified hereinabove.

TABLE 3

| Test compound No.[1]: | Discoloration degree—Sunshine carbon weatherometer 1000 hours |
|---|---|
| 1 | Pale yellow. |
| 2 | Do. |
| 13 | Yellowish white. |
| None | Brown. |

[1] The number of the test compound is the same as specified hereinabove.

EXAMPLE 9

Into 100 parts of 6-nylon ["CM 1011," trade name, available from Toyo Rayon Co. Ltd., Japan, containing no stabilizer] was incorporated 0.25 part of each of the test compounds of this invention indicated in the following Table 4. The resulting mixture was heated and melted and then molded into a film having a thickness of about 0.1 mm. under pressure. The film thus formed was exposed to ultraviolet ray irradiation in the fade meter prescribed in the above Example 7 at 45° C. for 300 hours. Thereafter, the exposed sheet was subjected to a standard tensile test to determine retentions of tensile strength and elongation.

The results are summarized in the following Table 4.

TABLE 4

| Test compound No.* | Retention of elongation (percent) | Retention of tensile strength (percent) |
|---|---|---|
| 2 | 40 | 82 |
| 6 | 42 | 75 |
| 13 | 35 | 87 |
| None | 8 | 72 |

*The number of the test compound is the same as specified hereinabove.

EXAMPLE 10

Into 100 parts of polyurethane prepared from polycaprolactone ["E-5080," trade name, available from The Nippon Elastollan Industries Ltd., Japan] was incorporated 0.5 part of each of the test compounds of this invention indicated in the following Table 5. The resulting mixture was heated and melted and then molded into a sheet having a thickness of about 0.5 mm. The sheet thus formed was subjected to the exposure to ultraviolet ray irradiation in the fade meter prescribed in the above Example 7 at 45° C. for 15 hours and then tested for retentions of elongation and tensile strength as in the above Example 9.

The results are summarized in the following Table 5.

TABLE 5

| Test compound No.* | Retention of elongation (percent) | Retention of tensile strength (percent) |
|---|---|---|
| 1 | 87 | 75 |
| 2 | 89 | 72 |
| 6 | 80 | 61 |
| 9 | 82 | 63 |
| 13 | 88 | 76 |
| None | 72 | 53 |

*The number of the test compound is the same as specified hereinabove.

From the above results as in Examples 7–10, it can be seen that the piperidone enol ethers of this invention show a high degree of stabilizing effect on synthetic polymers against deteriorations thereof.

What is claimed is:

1. A compound having the formula

[Structural formula: 2,2,6,6-tetramethyl-Δ³-dehydropiperidine with OR group at 4-position]

wherein R represents an alkyl group of 1–18 carbon atoms; a cycloalkyl group which contains 5 or 6 carbon atoms and may be substituted with an alkyl group of 1–4 carbon atoms or hydroxyl group; or the group of the formula —$CH_2$—R' in which R' represents an aryl group which contains 6–10 carbon atoms and may be substituted with an alkyl group of 1–4 carbon atoms, an alkoxy group of 1–4 carbon atoms, a halogen atom or hydroxyl group in the aryl moiety or a 5- or 6-membered heterocyclic group which contains oxygen atom as a hetero atom and may be substituted with an alkyl group of 1–4 carbon atoms, an alkoxy group of 1–4 carbon atoms, a halogen atom or hydroxyl group.

2. 4-n-butoxy-2,2,6,6-tetramethyl-Δ³-dehydropiperidine.

3. 4 - n-octyloxy-2,2,6,6-tetramethyl-Δ³-dehydropiperidine.

4. 4 - stearyloxy - 2,2,6,6 - tetramethyl - Δ³ - dehydropiperidine.

5. 4 - benzyloxy - 2,2,6,6 - tetramethyl - Δ³ - dehydropiperidine.

6. A process for preparing a compound having the formula

[Structural formula: 2,2,6,6-tetramethyl-Δ³-dehydropiperidine with OR group at 4-position]

wherein R represents an alkyl group of 1–18 carbon atoms; a cycloalkyl group which contains 5 or 6 carbon atoms and may be substituted with an alkyl group of 1–4 carbon atoms or hydroxy group; or the group of the formula —$CH_2$—R' in which R' represents an aryl group which contains 6–10 carbon atoms and may be substituted with an alkyl group of 1–4 carbon atoms, an alkoxy group of 1–4 carbon atoms, a halogen atom or hydroxyl group in the aryl moiety or a 5- or 6-membered heterocyclic group which contains oxygen atom as a hetero atom and may be substituted with an alkyl group of 1–4 carbon atoms, an alkoxy group of 1–4 carbon atoms, a halogen atom or hydroxyl group which comprises reacting triacetonamine with a compound having the formula

R—OH wherein R is as defined above in the presence of an acid catalyst.

References Cited

UNITED STATES PATENTS 3,381,013   4/1968   Minor _____ 260—297 R

ALAN L. ROTMAN, Primary Examiner

U.S. Cl. X.R.

260—45.8 R, 45.8 NZ